United States Patent [19]
Pendleton et al.

[11] 4,368,867
[45] Jan. 18, 1983

[54] TILT BASE FOR A CRT DISPLAY TERMINAL

[75] Inventors: Robert A. Pendleton, Dedham; John E. Edfors, Townsend; Leonard G. Whitford, Wakefield; Walter J. Conroy, Acton, all of Mass.

[73] Assignee: Honeywell Information Systems Inc., Waltham, Mass.

[21] Appl. No.: 278,287

[22] Filed: Jun. 29, 1981

[51] Int. Cl.³ .................................................. A47B 91/00
[52] U.S. Cl. ........................................ 248/346; 248/395; 248/678
[58] Field of Search ............... 248/346, 349, 371, 397, 248/395, 178, 133, 143, 139, 663, 678, 664, 668; 297/329

[56] References Cited

U.S. PATENT DOCUMENTS

| D. 253,594 | 12/1979 | Antenbring | D14/02 |
|---|---|---|---|
| 277,544 | 5/1883 | Chappell | 248/371 |
| 2,089,622 | 8/1937 | Schauss | 248/395 X |
| 2,245,713 | 6/1941 | Redmond | 248/395 |
| 2,805,776 | 9/1957 | Levitin | 248/172 X |
| 2,868,366 | 1/1959 | Shiffman | 248/346 X |
| 3,970,792 | 7/1976 | Benham | 248/183 X |

FOREIGN PATENT DOCUMENTS

| 16913 | 1/1980 | European Pat. Off. | 248/349 |
|---|---|---|---|
| 509033 | 10/1936 | United Kingdom | 297/329 |

*Primary Examiner*—J. Franklin Foss
*Attorney, Agent, or Firm*—Faith F. Driscoll; Nicholas Prasinos

[57] ABSTRACT

A tilt base assembly includes a base and pairs of elongated feet which attach to the bottom of a cathode ray tube (CRT) display terminal unit. The base includes a pair of trapezoidal shaped base members which attach to the ends of a horizontal plate. The elongated feet suspended from the bottom of the terminal unit rest on both inclined surfaces of each of the trapezoidal shaped base members. The front inclined surfaces of the trapezoidal shaped base members are constructed to include a plurality of indentations which provide a corresponding number of stationary positions for providing different operator viewing angles over a wide range of adjustment. Both front and rear inclined surfaces of the trapezoidal base members are provided with side walls so as to confine the terminal feet movement to the track-like areas within the side walls.

47 Claims, 15 Drawing Figures

TILT BASE FOR A CRT DISPLAY TERMINAL

BACKGROUND OF THE INVENTION

1. Field of Use

The present invention relates to positioning apparatus and more particularly to base support apparatus for adjusting the degree of tilt of the screen of a cathode ray tube display terminal device.

2. Prior Art

There has been a significant increase in the frequency of use of cathode ray tube (CRT) display terminal devices. Therefore, it becomes more essential to make such devices more convenient and comfortable for an operator to use.

One problem encountered by operators concerns the amount and angle of incident light which falls on the screen surface of the CRT display device and produces reflections making it impossible in some instances for an operator to view information being displayed on the screen. Normally, the amount of incident light varies with the time of day and the placement or positioning of the CRT device on the operator's work space. In view of this, it becomes very desirable for an operator to be able to alter the viewing angle of the CRT's screen surface so as to minimize or eliminate reflections.

Some prior art CRT display devices have the tilt mechanism built into the device. That is, the CRT tube casing or housing is mounted on pivotal support base structures which permit the tube screen to be tilted by the operator.

This type of arrangement has been found to introduce additional problems in constructing a suitable plastic housing or casing structure for the device. Also, it becomes difficult to provide a tilt mechanism sturdy enough to meet stringent shock and vibration test requirements.

Another prior art CRT display device uses a chassis which is pivotally mounted on a frame by two pivot pins. The viewing angle is adjusted by pivoting the chassis about the pivot pins. An example of this type of arrangement is disclosed in IBM Technical Disclosure Bulletin "Adjustable Mount for CRT Terminal", Vol. 21, No. 3, August 1978. These types of arrangements also have been found to require complex construction which results in increase in costs.

Another prior art arrangement has employed a separate stepped base support for mounting a CRT terminal unit. While the arrangement eliminates the need for special casing or housing structure, it requires the operator to lift the CRT terminal unit in order to adjust the screen viewing angle. Also, the arrangement only provides for a limited amount of viewing angle adjustment.

Accordingly, it is a primary object of the present invention to provide CRT terminal base support for adjustment of the CRT screen viewing angle which is inexpensive to construct.

It is a further object of the present invention to provide a tiltable base support which provides a wide range of CRT screen viewing angle adjustment without requiring a lifting action.

SUMMARY OF THE INVENTION

The above objects of the present invention are achieved in a preferred embodiment of the present invention which includes an assembly having a base and two pairs of elongated feet. The pairs of feet attach to the bottom of the CRT display terminal unit at locations defined by the terminal unit's center of gravity which provide maximum stability, wide range of viewing angle adjustment and ease of installation. The base includes a pair of trapezoidal shaped base members which attach to each end of a horizontal plate whose width is sufficient to accommodate the positioning of the pairs of feet appropriately on the desired parts of the trapezoidal shaped base members.

The elongated feet suspended from the bottom of the terminal unit rest on or bracket both inclined surfaces of each of the trapezoidal shaped base members. That is, the front and rear feet contact both front and rear inclined surfaces which form positive and negative angles with respect to each other relative to a horizontal plane. The front inclined surfaces of the trapezoidal shaped base members are arranged to include a plurality of indentations which provide a corresponding number of stationary positions for providing different operation viewing angles over a wide range of adjustment.

The trapezoidal or ramp shaped base members are optimally positioned relative to the center of gravity of the terminal unit. This minimizes the gravitational vertical forces exerted by the terminal unit feet on the surfaces of the ramp shaped base members. Also, the inclined surfaces are constructed to have a low coefficient of friction. This minimizes the horizontal components of frictional forces exerted by the terminal feed on the inclined surfaces.

Additionally, each of the inclined surfaces are equipped with side walls. This confines the terminal feet movement to track the like areas within the side walls thus preventing side slippage.

The center portion of each trapezoidal shaped base member is cut away to provide sufficient clearance to facilitate the initial installation of the terminal unit on the tilt base.

Generally, the terminal unit feet are positioned in the center indentations of the trapezoidal shaped base members which corresponds to approximately a 7° angle of tilt. Thereafter, by applying a gentle force to the terminal unit in either a forward or backward direction, this causes the terminal feet to slide down one pair of inclined surfaces and up the other set of inclined surfaces of the trapezoidal shaped base members. During this time, the terminal unit can be stopped on any set of indentations thereby enabling an operator or user to obtain the desired angle of tilt on the CRT screen surface. It was found that a less than 30° angle of inclination from a horizontal reference for the inclined surfaces of the trapezoidal base members provides the desired amount of tilt adjustment of approximately 14° (i.e., 7° from a vertical plane in each direction).

Another embodiment of the tilt base of the present invention includes an upper rectangular frame and base in non-adjustable and adjustable embodiments. In the non-adjustable embodiment, the tilt base includes a single piece upper rectangular frame member and single piece base plate. The adjustable embodiment includes a two-section upper rectangular frame member and two-section base plate. Each base plate section of the adjustable embodiment is constructed to have rows of holes near the front and back edges of each section. The sections are aligned relative to the bottom feet of the terminal unit to overlap one another as required to fit the width of the terminal unit as a function of the unit's center of gravity. Once properly aligned, the base sections are bolted together.

The sides of the upper frame member of both embodiments are molded to include front and rear feet. The width of the rectangular frame member of the non-adjustable embodiment is sufficient for positioning the pairs of feet relative to the terminal unit's center of gravity. The top surfaces of both such sides of the frame are covered with double side adhesive tape to enable their attachment to the bottom of the terminal.

The horizontal pieces of each half of the rectangular frame member of the adjustable embodiment attach to the sides as to overlap the other horizontal pieces as required for adjustment to a variety of CRT terminal units of different widths. The horizontal pieces of each half of the frame also include rows of holes which correspond to those of the two section plate. After the horizontal pieces have been aligned in the same manner as the base place sections, they are bolted together to complete the formulation of the rectangular frame.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
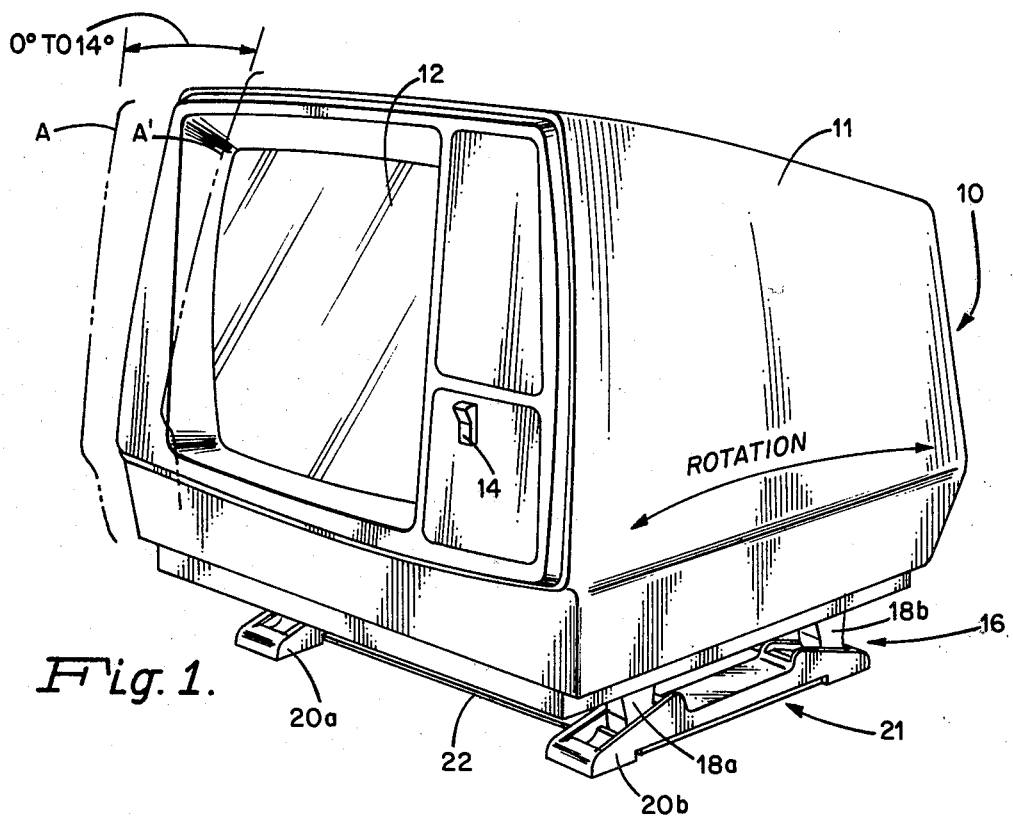
FIG. 1 is a perspective view of a first embodiment of the tilt base assembly of a first embodiment of the present invention as utilized with a cathode ray tube (CRT) display terminal unit.

FIG. 1 depicts a perspective view of a first embodiment of the tilt base assembly 16 of the present invention and associated cathode ray tube (CRT) display terminal unit 10.

The cathode ray tube (CRT) display terminal unit 10 powered on by a switch 14 includes a terminal chassis 11. The chassis 11 provides a mount for a cathode ray tube having a screen 12. The terminal unit 10 also includes a keyboard, not shown. For the purposes of the present invention, the terminal unit of FIG. 1 may take the form of the fifteen-inch CRT display terminal unit designated as the VIP7800 manufactured by Honeywell Information Systems Inc.

Figure 10A:
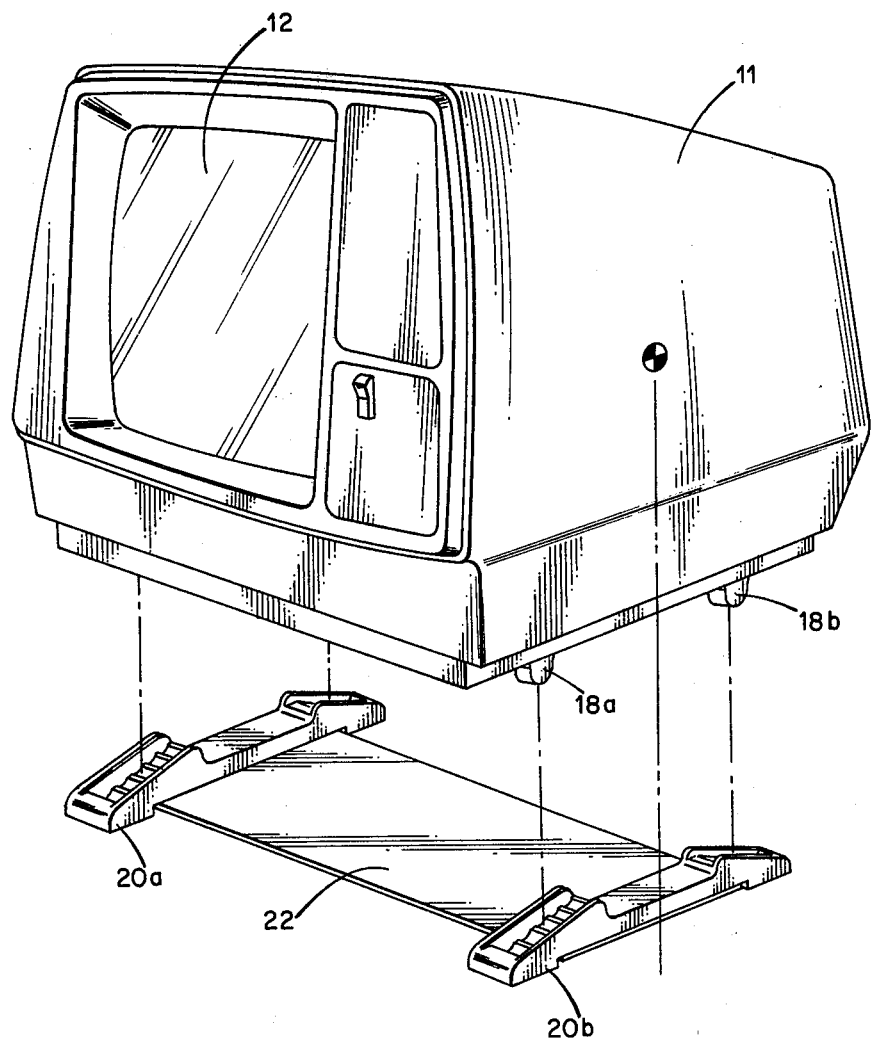
FIGS. 10A and 10B are different views of the tilt base assembly of the present invention utilized with a CRT display terminal unit illustrating the positioning of the elongated feet of the assembly relative to the terminal unit's center of gravity.
Figure 10B:
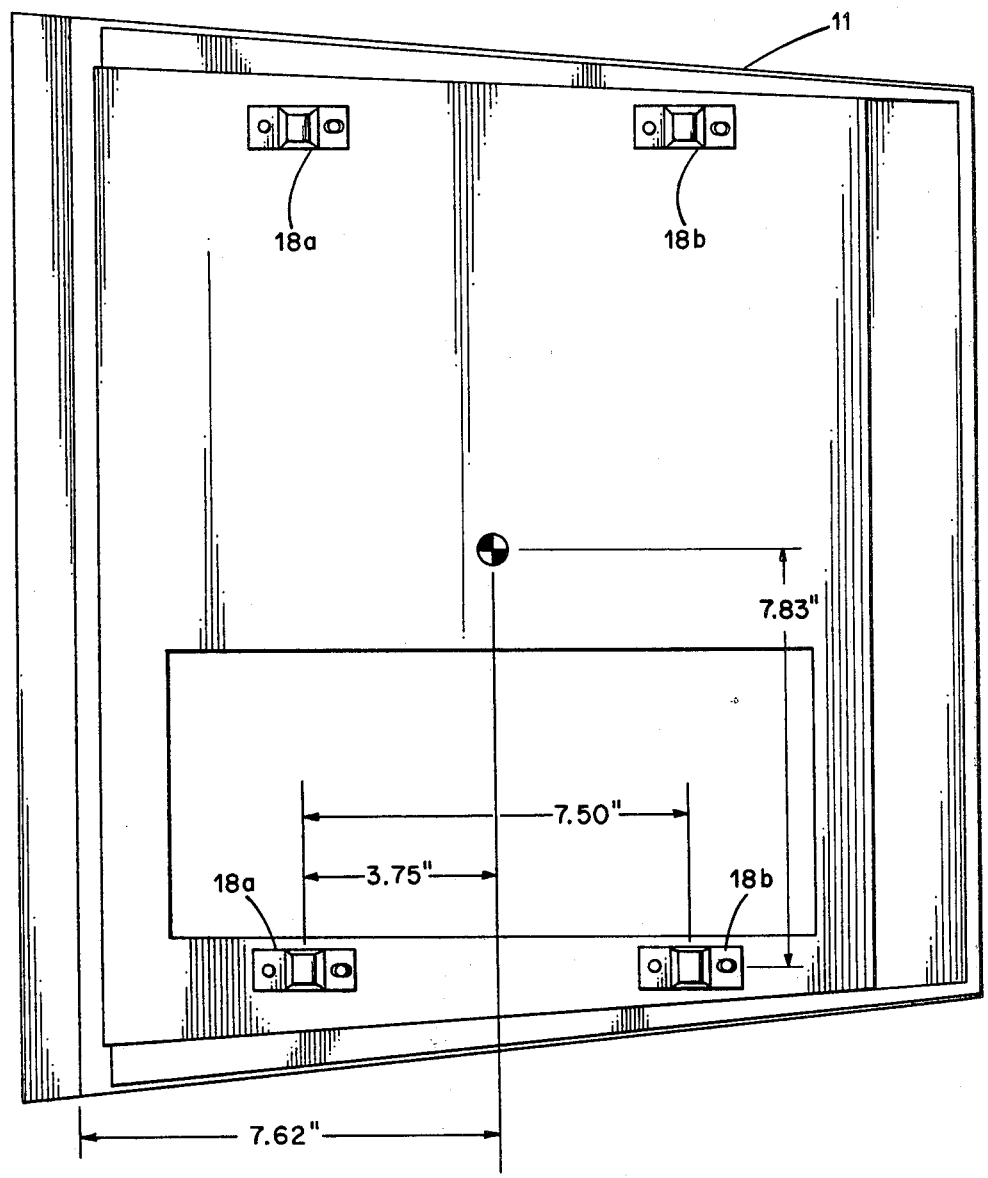

The tilt base assembly 16 includes two pairs of elongated feet only one pair labeled as 18a and 18b being shown. Both pairs attach to the bottom of the chassis 11 as shown in FIGS. 10A and 10B. More specifically, in accordance with the teachings of the present invention, the center of gravity, illustrated by the circular shaped symbol of the terminal 10, is located by empirical means and the pairs of feet 8a and 18b are positioned equidistant from that point. As explained herein, FIGS. 10B through 10E illustrate the positioning of the upper frame member of the non-adjustable second embodiment to the bottoms of CRT terminal units having different centers of gravity characteristics. It is desirable to locate the pairs of feet as close to the terminal chassis edges as possible to provide maximum stability and ease of installation. It will be appreciated that the particular construction (e.g. location of electronic components and CRT tube elements, etc. on the chassis) establishes the center of gravity characteristics of the terminal unit 10.

The assembly 16 also includes a base 21 having a pair of trapezoidal shaped base members 20a and 20b which attach to a horizontal plate 22 as explained herein. By moving the chassis 11 in the directions of rotation indicated, different angles of tilt within the indicated range of 0° to 14° for screen 12 are obtained.

Figure 2:
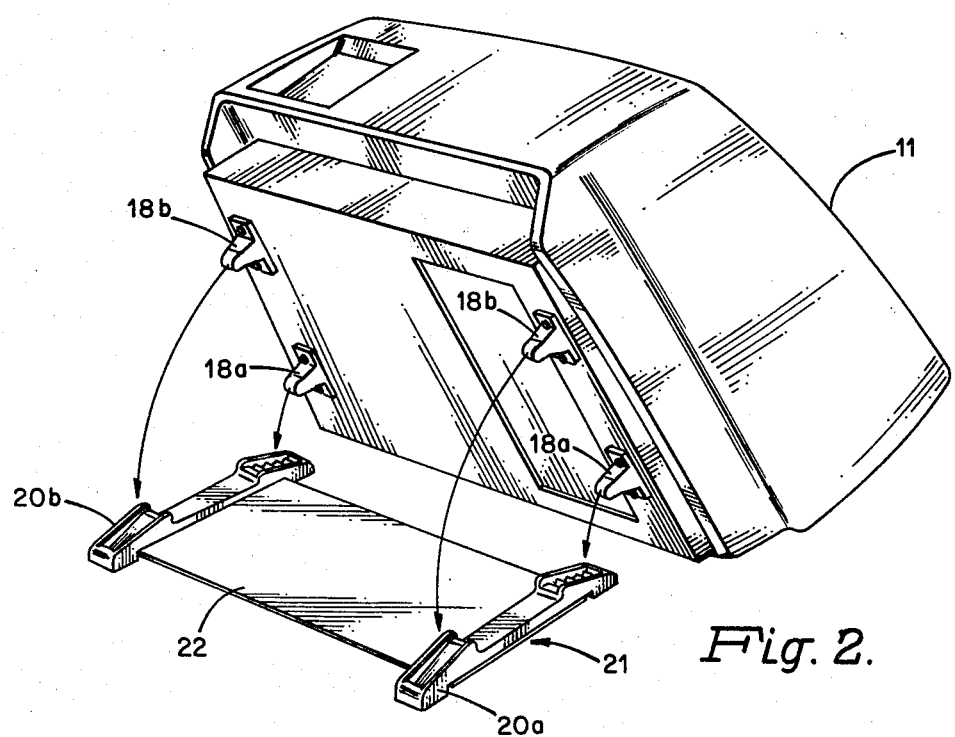
FIG. 2 is a perspective rear view of the tilt base assembly of FIG. 1 and the bottom view of the CRT display terminal unit.

FIG. 2 illustrates the manner in which the CRT terminal chassis 11 is to be mounted on the base 21 of the tilt base assembly 16. The terminal chassis 11 is mounted on base 21 by positioning the chassis 11 as shown in FIG. 2 and moving chassis 11 in the direction indicated by the arrows as shown in FIG. 1a.

Figure 3:
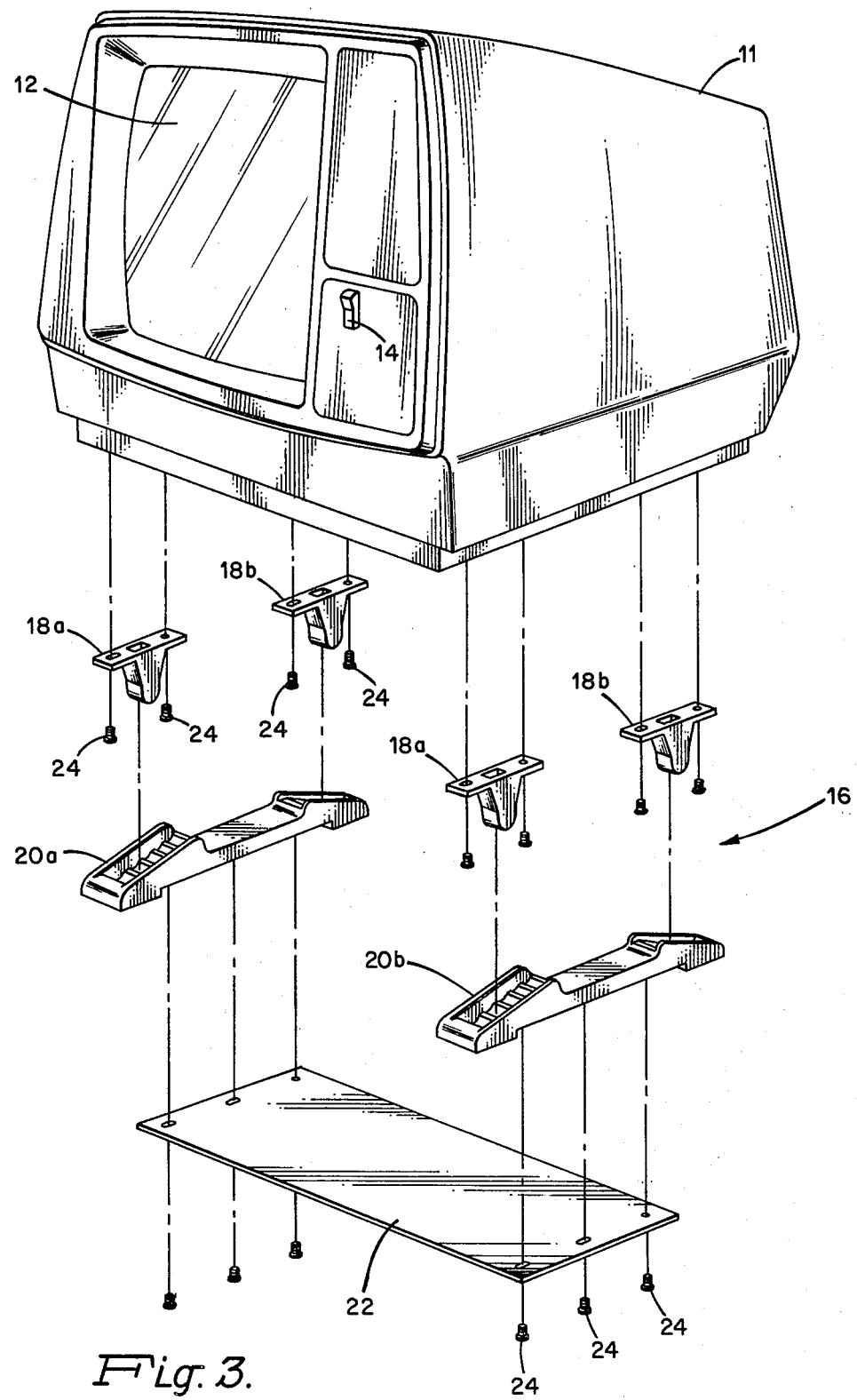
FIG. 3 is an enlarged perspective view of the tilt base assembly of FIG. 1.

FIG. 3 shows how the tilt base assembly is assembled. The pairs of elongated feet 18a, 18b are attached to the bottom of chassis 11 by means of the sets of screws 24. The pairs of feet are located so as to optimally position the trapezoidal shaped base members with respect to the terminal unit's center of gravity.

As shown, the two trapezoidal shaped base members 20a and 20b are attached to the base 22 by means of screws 24. The base is constructed from 0.06 inch carbon rolled steel for stability purposes.

Figure 4:
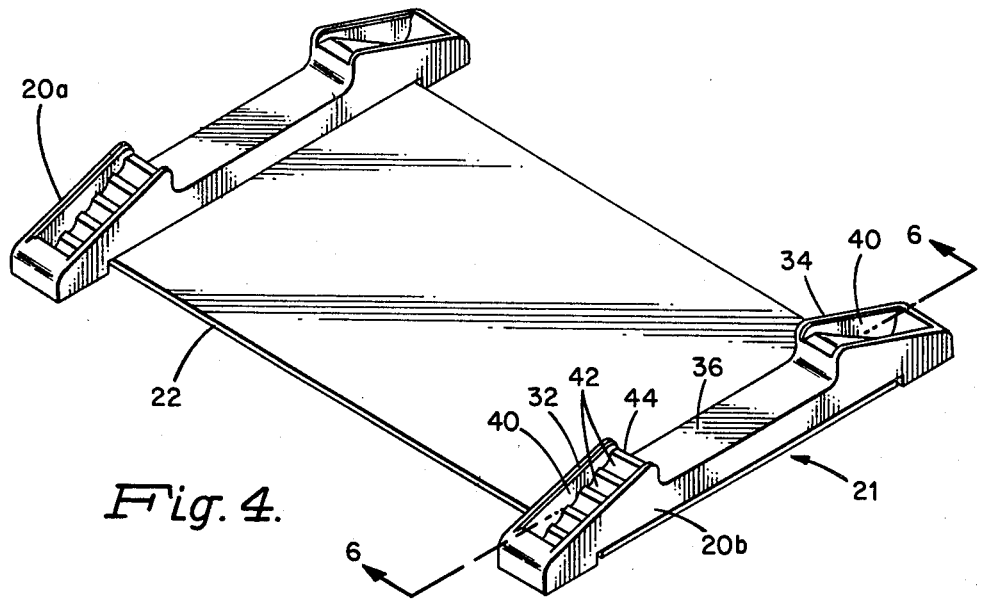
FIG. 4 is a perspective view of the base portion of the tilt base assembly of FIG. 1.
Figure 5:
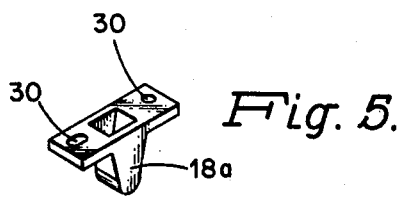
FIG. 5 is a perspective view of one elongated foot included as part of the tilt base assembly of FIG. 1.

FIGS. 4 and 5 illustrate in greater detail the different parts of the tilt base assembly 16. As seen from FIG. 5, each elongated foot, such as foot 18a, is constructed from molded plastic. Each foot includes two holes 30 for mounting to the bottom of chassis 11. It will be noted that each foot is rounded at the bottom so as to provide minimum friction in sliding up and down the inclined surfaces or ramps of members 20a and 20b. The left and right trapezoidal shaped base members 20a and 20b respectively are cut away at the bottom as shown to enable them to be attached to base 22. Each of the trapezoidal shaped base members are constructed from molded plastic to include front and rear ramp sections 32 and 34 separated by a center section 36. The center section is cut away so as to provide clearance for the hands of a person mounting or installing the CRT terminal unit 10 onto the tilt base 21 in the manner illustrated by FIG. 2. These sides confine the movement of the terminal unit feet to the widths of the ramp of elements 20a and 20b. Thus, any sideward thrust applied to terminal unit would not affect the positioning of the unit.

Figure 6:
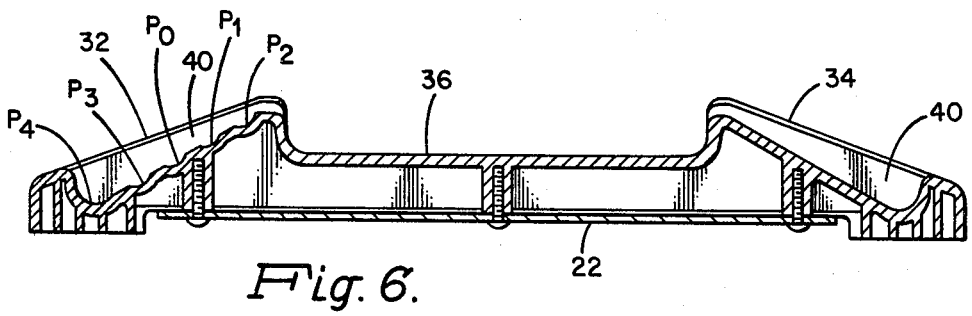
FIG. 6 is a sectional view of a trapezoidal shaped member of the tilt base assembly of FIG. 1 taken in the direction indicated by the line 6—6 of FIG. 4.

As shown, each of the front and rear ramps 32 and 34 have sides 40 which are illustrated in greater detail in FIG. 6.

The front ramp of each trapezoidal shaped base member includes a plurality of indentations 42 separated from each other by a corresponding number of surfaces or ridges 44. The indentations 42 provide different positions of tilt angle. The construction of the indentations 42 and ridges 44 are illustrated in greater detail in the enlarged view of the ramp section 32 illustrated in FIG. 7A. As seen from FIG. 7A, the ramp section 32 includes five indentations 42 separated by five ridges 44 so as to provide five different positions of tilt angle. The semicircular shape and depth dimensions of the indentations 42 are selected to have the values shown for providing the desired degree of stability and relatively easy movement from one position to another. Also, the edges (B) of the indentations 42 were rounded and the track surfaces were molded to provide a 63 microinch finish further facilitating easy movement.

Figure 7A:
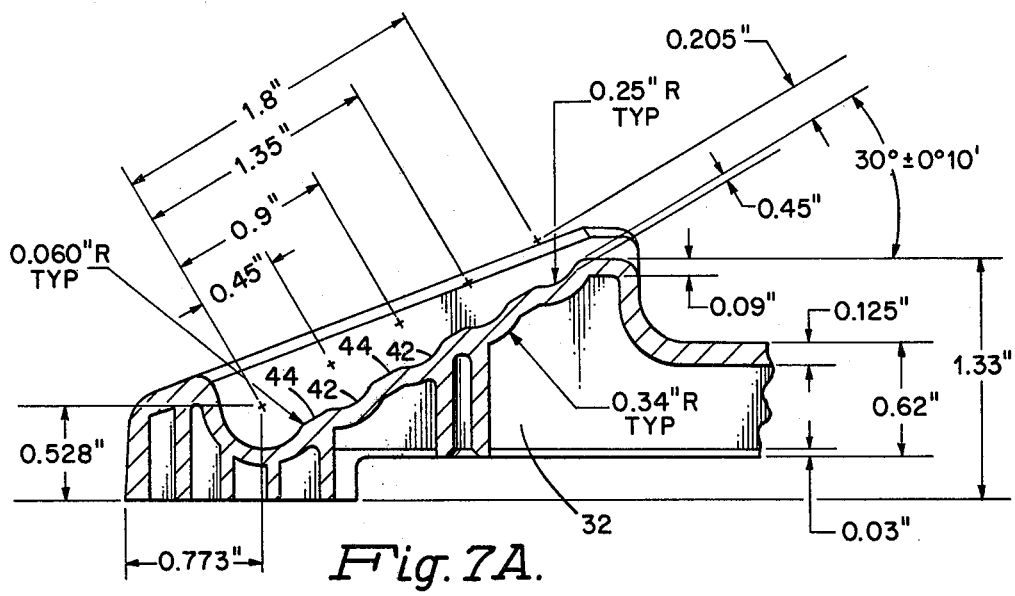
FIG. 7A is an enlarged sectional view of the front portion of the trapezoidal shaped member of FIG. 6.
Figure 7B:
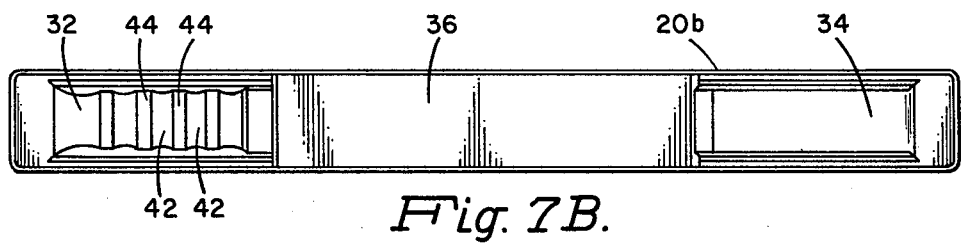
FIG. 7B is a top view of the trapezoidal shaped member of FIG. 6.

FIG. 7B shows another view of the trapezoidal shaped base member 32. As seen from FIG. 7B, the front ramp section 32 is somewhat tapered to facilitate the molding thereof. The rear ramp section 34 is untapered and does not include any indentations 42 and ridges 44. This permits one set of indentations to control the up and down movement of the terminal unit. Further, it eliminates construction and misalignment problems which would be created by the addition of a second set of indentations to ramp section 34.

In accordance with the teachings of the present invention, the height and angle of inclination of the ramp sections 32 and 34 were selected to have the dimensions shown to provide a desired amount of tilt adjustment and stability control. It was found that an angle of 30° or less measured from a horizontal reference point as shown in FIG. 7A provided the desired amount of adjustment and stability.

Figure 8:
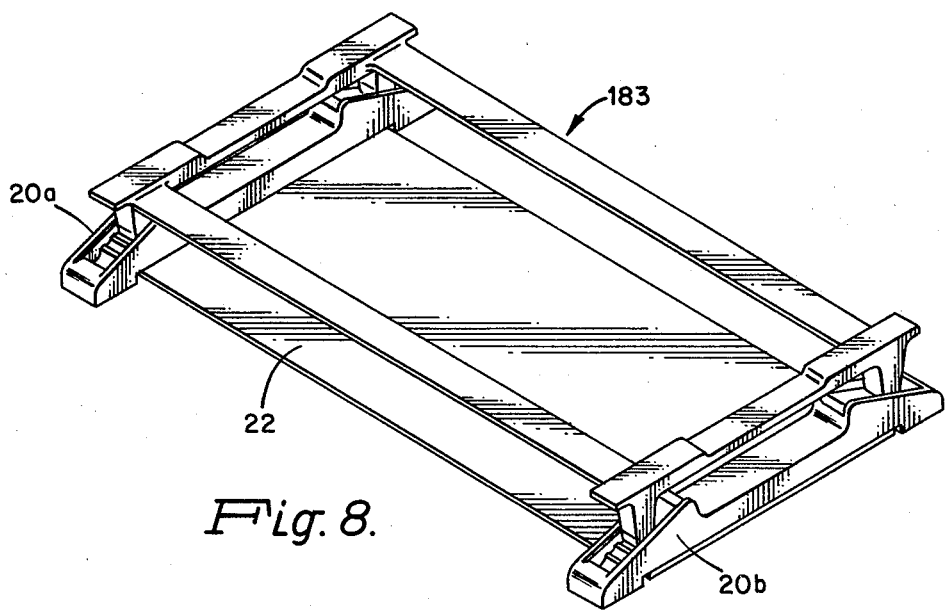
FIG. 8 is a perspective view of a non-adjustable second embodiment of the tilt base assembly of the present invention.
Figure 9:
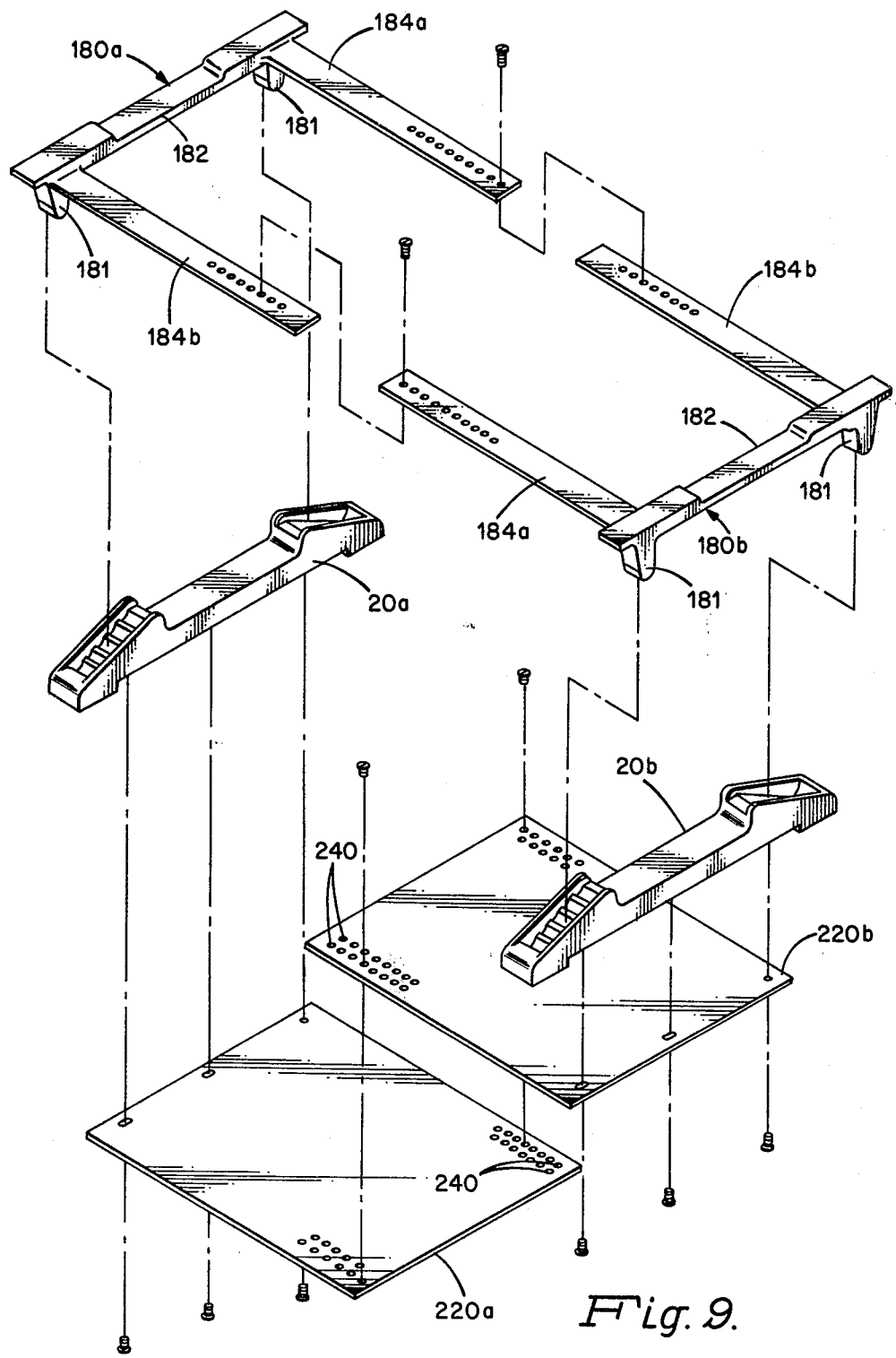
FIG. 9 is a enlarged perspective view of an adjustable second embodiment of the tilt base assembly of the present invention.
Figure 10C:
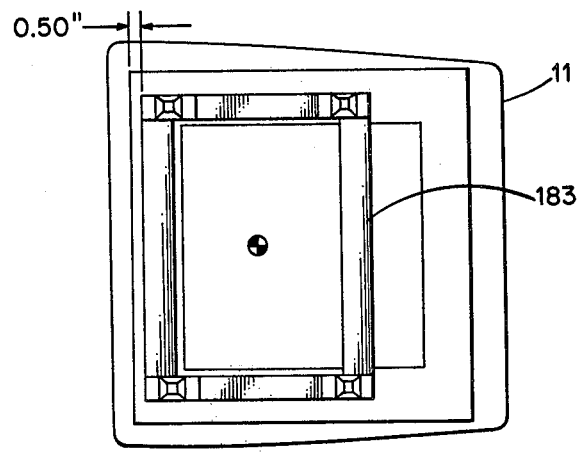
FIGS. 10C through 10E are bottom views of CRT display terminal units having different centers of gravity illustrating the positioning of the rectangular frame member of the non-adjustable second embodiment.
Figure 10D:
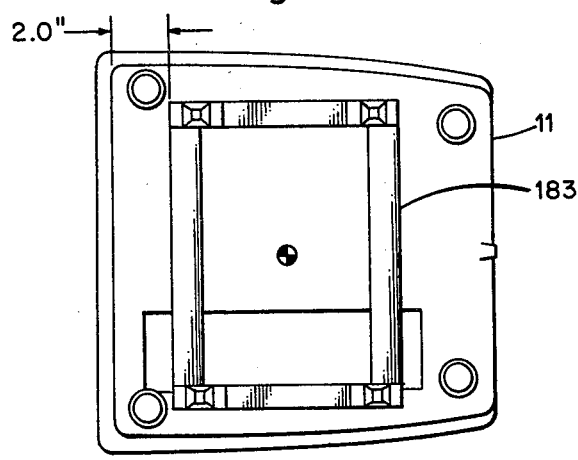
Figure 10E:
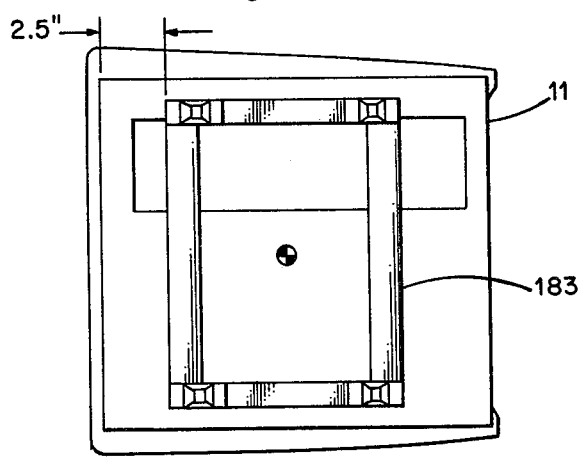

FIGS. 8 and 9 respectively illustrate non-adjustable and adjustable second embodiments of the present invention. These embodiments as seen from the Figures also utilize trapezoidal shaped base members 20a and 20b. These members are mounted to either an adjustable or non-adjustable base which permit usage of the tilt base invention with other types of CRT terminal units having similar center of gravity characteristics as illustrated by FIGS. 10C through 10E. The terminal units of FIGS. 10C through 10E may take the form of the twelve-inch CRT display terminal units designated as the VIP7200, VIP7300 and VIP7800, respectively, manufactured by Honeywell Information Systems Inc. The main difference between the first and second embodiments is that the tilt base assembly of each of the FIGS. 8 and 9 includes an upper molded plastic rectangular frame 183 which is attached to terminal unit 10.

As illustrated in FIG. 9, the base 210 of an adjustable second embodiment of the tilt base assembly is constructed of two base sections 220a and 220b. Both sections include a plurality of rows of matching holes 240 located near the front and back edges of the base sections 220a and 220b. These provide four inches of fine width adjustment.

The upper molded plastic frame 183 of the adjustable second embodiment consists of left and right positioned sections 180a and 180b. As seen from the Figures, each section includes a pair of elongated feet 181 which are shaped as illustrated in FIG. 5. The feet 181 form part of an upper section 182 of frame 183. Attached to each upper section 182 are a pair of like constructed horizontal members 183a, 184b. The members 184a and 184b of each section are vertically offset from one another so that they overlap with the corresponding members 184a and 184b of the other section as shown in FIG. 9.

Each pair of members 184a and 184b include the same row hole patterns as the base section associated therewith enabling assembling to take place as indicated in FIG. 9. Both top portions of each upper section 182 of the non-adjustable and adjustable second embodiments are coated with a double sided adhesive tape to enable easy attachment to the bottom of the CRT display terminal 10 of FIG. 1.

DESCRIPTION OF OPERATION

With reference to FIGS. 1 through 10E, the tilt base assembly of the operation of the present invention will now be discussed. As concerns the embodiment illustrated in FIGS. 1 through 7B, the elongated feet attached to the bottom of the CRT terminal unit are initially placed at a mid-point position on the ramp sections of trapezoidal shaped members 20a and 20b. This corresponds to point P0 in FIG. 6. At this point, the screen 12 of CRT terminal unit 10 of FIG. 1 would have an inclination of 7 degrees (mid-point between the lines A,A¹ in FIG. 1).

As a function of the amount of incident light, an operator will change this viewing angle. To increase the screen viewing angle, the operator need only gently apply a force to the front of the CRT display terminal unit 10. This results in sliding the terminal unit 10 up the front ramp sections of members 20a and 20b into one of the two indentations P1 or P2 in FIG. 6. When the terminal unit 10 is made to come to rest at indentation P2, the viewing angle increases to 14 degrees (i.e., line A¹ in FIG. 1). In a similar fashion, the operation may decrease the viewing angle by applying a force which causes the terminal unit 10 to move in a forward direction (i.e., toward the operator when the operator is facing screen 12). An operator may accomplish this by placing a hand on the top of unit 10 and exerting a forward and downward force. This causes the terminal unit 10 to slide down the front ramp sections of members 20a and 20b into one of the two indentations P3 or P4 in FIG. 6. When the unit 10 is made to come to rest at indentation P4, the screen viewing angle decreases to 0 degrees (i.e., line A in FIG. 1). Normally, the changes in screen viewing angle does not occur very frequently. The operator may also want to change the screen viewing angle to coincide with the operator's position. For example, if the operator wants to stand up for a certain length of time, the operator will slide the unit 10 to its rear most position (i.e., indentation P2 in FIG. 6).

The non-adjustable and adjustable second embodiments illustrated in FIGS. 8 and 9 will be positioned in an identical fashion as that described above. Thus, the difference between using the tilt base assembly of this embodiment and the first embodiment resides in assembling the two embodiments. The non-adjustable version is assembled by attaching the upper frame 183 of FIG. 8 to the bottom of terminal unit 10. Normally, a template will be provided for ease of installation. The template designates the appropriate positioning of the rectangular frame 183 based on the center of gravity characteristics of the terminal unit 10. As seen from FIGS. 10A through 10E, the positioning of frame 183 varies as a function of the terminal unit's center of gravity. FIGS. 10A and 10B illustrate the positioning of rectangular frame 183 for the terminal unit 10 of FIG. 1. FIGS. 10C through 10E illustrate the positioning of frame 183 for terminal units having different center of gravity characteristics. In FIG. 10C, the frame 183 is positioned closer toward the front of the unit 10 due to the heavy weight characteristics of the CRT utilized therein. In FIG. 10D, the frame 183 is positioned further away from the front of the unit 10 due to the location of transformer and other electrical components therein very close to the rear of chassis 11 and the absence of components in the area represented by the rectangle located near the bottom edge of the chassis 11. It will be noted that the original terminal unit feet remain intact. Lastly, in FIG. 10E, the frame 183 is positioned still further away from the front of the unit 10 due to a still different positioning of transformer and other electrical components therein not as close to the rear of chassis 11 and the absence of components in the area represented by the rectangle located near the top edge of the chassis 11.

The adjustable version is assembled in a similar fashion using such a template after the frame sections and base sections have been assembled according to FIG. 9.

The above has illustrated tilt base assemblies which are inexpensive to construct and very easy to adjust to operator work conditions. The major portions of the assemblies fit under the CRT display terminal and do not significantly add or increase the height of the terminal unit which could cause operator inconvenience. Also, the constructions of the assemblies make installation convenient and easy.

It will be appreciated by those skilled in the art that many changes may be made to the preferred embodiments of the present invention to accommodate terminal units having different center of gravity characteristics. Of course, as discussed herein, the adjustable and non-adjustable second embodiments of the present invention makes it possible to accommodate terminal units having similar center of gravity characteristics.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A tilt base assembly for supporting a CRT display terminal unit having a predetermined center of gravity characteristic for providing a wide range of operator viewing angles, said assembly comprising:
   pairs of elongated feet adapted to be positioned on the bottom of said terminal unit at predetermined front and rear locations selected in accordance with said predetermined center of gravity characteristic so as to provide said wide range of viewing angles; and
   a base member including:
      a plate; and
      a pair of trapezoidal shaped base members, each of said base members being attached to said plate at predetermined positions for enabling the positioning of said pairs of feet attached to said unit equidistant front and rear from said center of gravity along a reference plane which is perpendicular to the direction of movement so as to minimize gravity forces established by said said predetermined center of gravity characteristic of said unit and each of said base members including front and rear ramp portions, at least said front ramp portions having a series of indentations for enabling said unit to be moved by an operator to a corresponding number of viewing angle positions within said wide range.

2. The tilt base assembly of claim 1 wherein each of said series of indentations of each front ramp portion contoured to have a semicircular shape with the same predetermined radius relative to the slope of said ramp portion, said predetermined radius being selected to provide ease of movement between viewing angle positions and the required amount of stability.

3. The tilt base assembly of claim 2 wherein said predetermined radius corresponds to approximately 0.250 inches.

4. The tilt base assembly of claim 2 wherein the slopes of said front and rear ramp portions form equal and opposite angles with respect to the same horizontal plane.

5. The assembly of claim 4 wherein said angles are no more than 30 degrees.

6. The assembly of claim 2 wherein the ends of each indentation are rounded in accordance with a predetermined radius so as to further provide said ease of movement.

7. The assembly of claim 6 wherein said predetermined radius corresponds to approximately 0.06 inches.

8. The assembly of claim 1 wherein said pairs of feet have a convex contour to minimize frictional forces exerted by said terminal unit on said trapezoidal shaped base members.

9. The assembly of claim 1 wherein said predetermined locations are as close to the edge of said terminal unit as permitted for maintaining stability so as to facilitate the mounting of said terminal unit pairs of feet on said trapezoidal shaped members.

10. The assembly of claim 9 wherein each of said predetermined locations is positioned within a distance of two inches from said edge.

11. The assembly of claim 1 wherein said plate has a width which corresponds to the width of said terminal unit and said plate is made of steel.

12. The assembly of claim 1 wherein said predetermined positions of said trapezoidal shaped members permit said parts of feet to be placed at the midpoints of said ramp portions of said trapezoidal shaped base members.

13. The assembly of claim 12 wherein each of said trapezoidal shaped base members has a center portion, said center portion being cut away for ease of mounting said terminal unit on said assembly.

14. The assembly of claim 12 wherein said ramp portions of each said trapezoidal shaped member base side walls for confining said feet within a track area so as to prevent side motion and ensure stability.

15. The assembly of claim 14 wherein said trapezoidal shaped base molded members are from plastic material having a predetermined hardness characteristic.

16. The assembly of claim 15 wherein said ramp portions of each of said pair of trapezoidal shaped base members have smooth surfaces which minimize the horizontal components of frictional forces.

17. The assembly of claim 1 wherein said number of viewing angle positions corresponds to five and said wide range corresponds to at least 14 degrees.

18. The assembly of claim 11 wherein said midpoints correspond to middle ones of said series of indentations of said front ramp portions which provides a viewing angle of approximately 7 degrees.

19. The assembly of claim 11 wherein when said terminal unit is moved completely forward down said front ramp portions the pair of feet associated therewith are positioned in first ones of said series of indentations providing a minimum viewing angle relative to a vertical reference.

20. The assembly of claim 19 wherein said minimum viewing angle approximates 0 degrees.

21. The assembly of claim 11 wherein when said terminal unit is moved completely back up said front ramp portions, the pair of feet associated therewith are positioned in last ones of said series of indentations providing a maximum viewing angle relative to a vertical reference.

22. The assembly of claim 21 wherein said maximum viewing angle approximates at least 14 degrees.

23. A tilt base assembly for supporting a CRT display terminal unit having a predetermined center of gravity characteristic for providing a wide range of operator viewing angles, said assembly comprising:
   a rectangular frame member each of whose sides include a pair of elongated feet located at front and rear points on said sides, said frame being adapted to be positioned on the bottom of said terminal unit at a predetermined location selected in accordance with said predetermined center of gravity characteristic so as to provide said wide range of viewing angles; and
   a base member including:
   a plate; and,
   a pair of trapezoidal shaped base members, each of said base members being attached to said plate at predetermined positions for positioning said pairs of feet of said frame member attached to said unit equidistant front and rear from said center of gravity along a reference plane which is perpendicular to the direction of movement so as to minimize gravity forces established by said predetermined center of gravity characteristic and each of said base members including front and rear ramp positions, at least said front ramp portions having a series of indentations for enabling said unit to be moved by an operator to a corresponding number of viewing angle positions within said wide range.

24. The tilt base assembly of claim 23 wherein each of said series of indentations of each front ramp portion are contoured to have a semicircular shape with the same predetermined radius relative to the slope of said ramp portion, said predetermined radius being selected to provide ease of movement between viewing angle positions and the required amount of stability.

25. The tilt base assembly of claim 24 wherein the slopes of said front and rear ramp portions form equal and opposite angles with respect to the same horizontal plane.

26. The assembly of claim 25 wherein said angles are no more than 30 degrees.

27. The assembly of claim 24 wherein the ends of each indentation are rounded in accordance with a predetermined radius so as to further provide said ease of movement.

28. The assembly of claim 23 wherein said pairs of feet have a convex contour to minimize frictional forces exerted by said terminal unit on said trapezoidal shaped base members.

29. The assembly of claim 23 wherein said predetermined location is selected to be as close to the edge of said terminal unit as permitted for maintaining stability so as to facilitate the positioning of said terminal unit pairs of feet on said trapezoidal shaped members.

30. The assembly of claim 29 wherein each of said predetermined locations is positioned within a distance of less than two inches from said edge.

31. The assembly of claim 23 wherein said predetermined positions of said trapezoidal shaped members permit said pairs of feet of said rectangular frame member to be placed at the midpoints of said ramp portions of said trapezoidal shaped base members.

32. The assembly of claim 31 wherein each of said trapezoidal shaped base members has a center portion, said center portion being cut away for ease of mounting said terminal unit on said assembly.

33. The assembly of claim 31 wherein said ramp portions of each said trapezoidal shaped member base side walls for confining said feet within a track area so as to prevent side motion and ensure stability.

34. The assembly of claim 23 wherein said number of viewing angle positions corresponds to five and said wide range corresponds to at least 14 degrees.

35. The assembly of claim 34 wherein said midpoints correspond to middle ones of said series of indentations of said front ramp portions which provides a viewing angle of approximately 7 degrees.

36. The assembly of claim 34 wherein when said terminal unit is moved completely down said front ramp portions the pair of feet associated therewith are positioned in first ones of said series of indentations providing a minimum viewing angle relative to a vertical reference.

37. The assembly of claim 34 wherein when said terminal unit is moved completely back up said front ramp portions, the front pair of feet of said rectangular frame member are positioned in last ones of said series of indentations providing a maximum viewing angle relative to a vertical reference.

38. A tilt base assembly for supporting CRT display terminal units having similar center of gravity characteristics for providing a wide range of operator viewing angles, said assembly comprising:
   an adjustable rectangular frame member each of whose sides include a pair of elongated feet located at front and rear points on said sides and having overlapped split horizontal sections, the portions of each split overlapped horizontal section having predetermined areas containing series of holes for adjusting the width of said frame member to terminal units of different widths having said similar center of gravity characteristics, said frame being adapted to be positioned on the bottom of a terminal unit at a predetermined location selected in accordance with said predetermined center of gravity characteristic of said terminal unit so as to provide said wide range of viewing angles; and an adjustable base member including:

a plate including first and second sections, predetermined areas of said first and second sections having series of holes for adjusting the width of said plate in accordance with the positioning of said frame member; and, a pair of trapezoidal shaped base members, each of said base members being attached to said plate at predetermined positions for positioning said pairs of feet of said frame member equidistant front and rear from said center of gravity along a reference plane which is perpendicular to the direction of movement so as to minimize gravity forces established by said predetermined center of gravity characteristic and each of said base members including front and rear ramp portions, at least said front ramp portions having a series of indentations for enabling said unit to be moved by an operator to a corresponding number of viewing angle positions within said wide range.

39. The tilt base assembly of claim 38 wherein each of said series of indentations of each front ramp portion contoured to have a semicircular shape with the same predetermined radius relative to the slope of said ramp portion, said predetermined radius being selected to provide ease of movement between viewing angle positions and the required amount of stability.

40. The tilt base assembly of claim 38 wherein the slopes of said front and rear ramp portions form equal and opposite angles with respect to the same horizontal plane.

41. The assembly of claim 38 wherein said pairs of feet have a convex contour to minimize frictional forces exerted by said terminal unit on said trapezoidal shaped base members.

42. The assembly of claim 41 wherein said predetermined location is selected to be as close to the edge of said terminal unit as permitted for maintaining stability so as to facilitate the positioning of said terminal unit pairs of feet on said trapezoidal shaped members.

43. The assembly of claim 38 wherein said predetermined positions of said trapezoidal shaped members permit said pairs of feet of said frame member to be placed at the midpoints of said ramp portions of said trapezoidal shaped base members.

44. The assembly of claim 43 wherein said ramp portions of each said trapezoidal shaped member base side walls for confining said feet within a track area so as to prevent side motion and ensure stability.

45. The assembly of claim 38 wherein said number of viewing angle positions corresponds to five and said wide range corresponds to at least 14 degrees.

46. The assembly of claim 45 wherein when said terminal unit is moved completely forward down said front ramp portions the pair of feet associated therewith are positioned in first ones of said series of indentations providing a minimum of viewing angle relative to a vertical reference.

47. The assembly of claim 45 wherein when said terminal unit is moved completely back up said front ramp portions, the pair of feet associated therewith are positioned in last ones of said series of indentations providing a maximum viewing angle relative to a vertical reference.

* * * * *